(12) United States Patent
Hurwitz (10) Patent No.: US 7,331,311 B2
(45) Date of Patent: *Feb. 19, 2008

(54) ABRASION RESISTANT OMNIDIRECTIONALLY REFLECTIVE ROPE

(75) Inventor: Marni Markell Hurwitz, Far Hills, NJ (US)

(73) Assignee: Nite Glow Industries, Inc., Far Hills, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/601,354

(22) Filed: Nov. 17, 2006

(65) Prior Publication Data

US 2007/0062433 A1    Mar. 22, 2007

Related U.S. Application Data

(63) Continuation-in-part of application No. 11/185,059, filed on Jul. 20, 2005, now Pat. No. 7,204,206, which is a continuation-in-part of application No. 11/067,442, filed on Feb. 25, 2005, now Pat. No. 6,978,738, which is a continuation-in-part of application No. 10/935,687, filed on Sep. 8, 2004, now Pat. No. 6,925,965.

(60) Provisional application No. 60/591,936, filed on Jul. 28, 2004.

(51) Int. Cl.
    *A01K 27/00* (2006.01)

(52) U.S. Cl. .................... 119/795; 119/858

(58) Field of Classification Search ............ 119/793, 119/795, 769, 858, 797, 798, 859

See application file for complete search history.

(56) References Cited

U.S. PATENT DOCUMENTS

| | | | |
|---|---|---|---|
| 3,176,584 A | 4/1965 | DeVries et al. | 359/539 |
| 3,190,178 A | 6/1965 | McKenzie | 359/514 |
| 4,025,159 A | 5/1977 | McGrath | 359/514 |
| 4,167,156 A | 9/1979 | Kupperman et al. | 119/795 |
| 4,576,850 A | 3/1986 | Martens | 428/156 |
| 4,582,885 A | 4/1986 | Barber | 528/28 |
| 4,668,558 A | 5/1987 | Barber | 428/156 |
| 4,763,985 A | 8/1988 | Bingham | 359/518 |
| 4,815,818 A | 3/1989 | Thomas | 359/546 |
| 4,950,525 A | 8/1990 | Bailey | 428/164 |
| 4,957,335 A | 9/1990 | Kuney | 359/541 |
| 5,066,098 A | 11/1991 | Kult et al. | 359/540 |

(Continued)

*Primary Examiner*—Son T. Nguyen
(74) *Attorney, Agent, or Firm*—Ernest D. Buff & Associates, LLC; Ernest D. Buff (57) ABSTRACT

A flexible abrasion resistant omnidirectionally reflective rope has a central braided high strength core comprising gel fiber or p-aramid fibers that is surrounded by cylindrically braided sleeve of reflective strips composed of narrow width reflective strips that comprise a woven or knitted narrow width strip and a flexible nylon retroreflective sheet sewn thereon and covered with abrasion resistant coating. The flexible retroreflective sheet is formed by thermally bonding corner cube, microsphere retroreflectors, or wide angle exposed retroreflective lenses to a flexible polymeric sheet. Due to its braided construction, the reflective rope reflects light omnidirectionally over a large angle of acceptance, thereby providing an improved measure of safety in the marine craft environment. The reflected light beam provides accurate illumination of the marine craft gunnels, sail edges, mooring lines, railings and the like when the omnidirectionally reflective rope is used during dusk, fog or nighttime hours.

21 Claims, 4 Drawing Sheets

U.S. PATENT DOCUMENTS

| | | | |
|---|---|---|---|
| 5,117,304 A | 5/1992 | Huang et al. | 359/529 |
| 5,200,262 A | 4/1993 | Li | 442/379 |
| 5,237,448 A | 8/1993 | Spencer et al. | 119/792 |
| 5,243,457 A | 9/1993 | Spencer | 119/795 |
| 5,283,101 A | 2/1994 | Li | 428/141 |
| 5,777,790 A | 7/1998 | Nakajima | 359/536 |
| 5,882,796 A | 3/1999 | Wilson et al. | 428/411.1 |
| 5,910,858 A | 6/1999 | Frey | 359/534 |
| 5,926,314 A | 7/1999 | Smith et al. | 359/530 |
| 5,962,108 A | 10/1999 | Nestegard et al. | 428/172 |
| 6,159,537 A | 12/2000 | Crandall | 427/163.4 |
| 6,355,349 B2 | 3/2002 | Chizmas | 428/383 |
| 6,394,623 B1 | 5/2002 | Tsui | 362/249 |
| 6,604,841 B2 | 8/2003 | Liu | 362/252 |
| 6,677,028 B1 | 1/2004 | Lasch et al. | 428/161 |
| 6,907,685 B1 | 6/2005 | Falkner et al. | 40/597 |
| 6,925,965 B1 | 8/2005 | Hurwitz | 119/793 |
| 6,953,262 B2 | 10/2005 | Cleaver et al. | 362/219 |
| 6,965,205 B2 | 11/2005 | Piepgras et al. | 315/318 |
| 2001/0024364 A1* | 9/2001 | Hurwitz | 362/84 |
| 2003/0206419 A1 | 11/2003 | Longatti et al. | 362/551 |
| 2004/0037080 A1 | 2/2004 | Luk et al. | 362/252 |
| 2005/0157389 A1 | 7/2005 | Shipman et al. | 359/529 |
| 2005/0157390 A1 | 7/2005 | Weiss et al. | 359/529 |
| 2005/0162850 A1 | 7/2005 | Luk et al. | 362/227 |
| 2006/0021585 A1 | 2/2006 | Hurwitz | 119/795 |
| 2006/0026933 A1 | 2/2006 | Hurwitz | 54/24 |
| 2006/0026934 A1 | 2/2006 | Hutwitz | 54/24 |
| 2006/0027188 A1 | 2/2006 | Hurwitz | 119/795 |

\* cited by examiner

ABRASION RESISTANT OMNIDIRECTIONALLY REFLECTIVE ROPE

CROSS-REFERENCE TO RELATED APPLICATIONS

This application is a continuation-in-part of U.S. application Ser. No. 11/185,059, filed Jul. 20, 2005 now U.S. Pat. No. 7,204,206 which, in turn is a continuation-in-part of U.S. application Ser. No. 11/067,442, filed Feb. 25, 2005 now U.S. Pat. No. 6,978,738, which, in turn is a continuation-in-part of U.S. application Ser. No. 10/935,687, filed Sep. 8, 2004 now U.S. Pat. No. 6,925,965 which, in turn, claims the benefit of Application No. 60/591,936, filed Jul. 28, 2004.

BACKGROUND OF THE INVENTION

1. Field of the Invention

The present invention relates to reflective materials; and, more particularly, to an abrasion resistant omnidirectionally reflective rope that reflects light back to the lighting source, and which can be attached to the gunnels or sails of marine craft to outline the shape of a vessel, increase visibility of mooring lines and provide a margin of safety that reduces boating accidents during navigation in harbors under dimly lit conditions.

2. Description of the Prior Art

Boats and vessels for marine and lake use face special problems during dusk and night time navigation, or during fog events that limit visibility. Larger vessels and boats rely on board lighting sources to guide their way. Even then, marine craft risk collision with the edge of another vessel or with lines attached to moorings or fishing nets. These collisions can damage smaller boats and lead to injury or loss of lives. In light of their large driving power and weight, navigation of marine craft requires precise control of a vessels speed and direction. As such, the navigator needs adequate visible clues to assess collision probabilities. Oftentimes, these visual clues are not available due to the limited range and area coverage provided by on board lighting sources.

Retro-reflective reflectors are known in the art, but have not been available on rope that can be twisted and handled in a marine environment. Rope has been equipped with active powered lighting sources. Such rope is unsuited for marine craft applications due to the requirement of electrical power, which may be easily short circuited by sea water, or even lake water. In general, use of wires, bulbs, LEDS, photo-luminescent devices and other illumination sources presents extremely unreliable lighting sources, considering the abuse to which ropes are subjected in a marine craft environment. None of the prior art patent disclosure an abrasion resistant omnidirectionally reflective rope suited for marine craft applications.

U.S. Pat. Nos. 6,394,623, 6,604,841, 6,907,685, 6,953, 262 and 6,965,205, patent applications Ser. Nos. 20030206419, 20040037080, 20050162850 and 20060021585 disclose ropes with active illuminating devices such as a lamps, LEDs or electroluminescent devices that are powered by an electrical power source. These illuminated ropes do not omindirectionally reflect light back to the source to thereby provide enhanced visibility during dusk, fog or dark surroundings. Moreover, electrical circuits used in these devices would likely be short circuited in a marine craft environment.

Numerous patents disclose reflective materials. Some of these patents disclose reflective elements having corner cube shapes embedded in rigid or flexible polymeric strips and monolayers of spherical beads, i.e. primarily glass beads bonded to a reflective sheet.

U.S. Pat. No. 3,176,584 to DeVries, et al. discloses that a reinforcing layer may be incorporated into an embedded lens retroreflective sheeting. The reinforcing layer may have a composition similar to that of the binder in which the microspheres are embedded. The layer may be applied to the back side of the secularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. The reflective layer is typically very thin and fragile, i.e. in the order of 0.06 microns thick, and must be disposed in special relationship to the microspheres in order for the sheeting to provide useful retro-reflection. This thin fragile retro-reflection coating is unsuited for use as a rope that must withstand bending and twisting forces prevalent with marine craft applications.

U.S. Pat. No. 3,190,178 to McKenzie discloses reflex reflective sheeting. A monolayer of microspheres is embedded in a polymer to reflect the incoming light beam in the same direction as the incident beam. Since the sheet is formed by melting of the polymeric binder, it is rigid and therefore unsuitable for flexible ropes.

U.S. Pat. No. 4,025,159 to McGrath discloses cellular retroreflective sheeting. The cellular retroreflective sheeting comprises a base layer of retroreflective elements and a transparent cover film supported in spaced relation away from the base layer by a network of narrow intersecting bonds. These bonds form hermetically sealed cells within which retroreflective elements are isolated from retroreflective elements of different cells. The resultant sheeting achieves greater durability through use of bonds that are cured in situ after they have been thermoformed into sealing contact between the cover film and base layer. The base material is coated with the binder, subjected to heat and pressure to displace the binder around the embedded microsphers or corner cubes forming the bonded network. Retroreflective articles so constructed may be rigid and inflexible.

U.S. Pat. No. 4,576,850 to Martens, as well as U.S. Pat. Nos. 4,582,885 and 4,668,558 to Barber, disclose shaped plastic articles having replicated microstructure surfaces. These shaped plastic articles are made by crosslinked polymers with hard and soft segments having a microstructure-bearing surface that is replicated with a castable fluid and radiation hardened. Articles formed by this process exhibit, retro-reflective cube-corner sheeting, a Fresnel lens or a videodisc. All these formed articles are rigid and therefore unsuitable for use as ropes. Moreover, these articles also exhibit low tear strength.

U.S. Pat. No. 4,763,985 to Bingham discloses a launderable retroreflective appliqué that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides. This reflective appliqué is not a marine craft rope.

U.S. Pat. No. 4,815,818 to Thomas discloses three-dimensional flexible reflectors. The reflector is provided with an elastomeric resilient member having a plurality of embedded retro-reflective glass beads. A portion of the outer surface of the elastomeric material is removed to expose the glass beads. The exterior surface of the glass beads at the outer surface is exposed and is subject to abrasion and is therefore not suited for a marine craft rope.

U.S. Pat. No. 4,950,525 to Bailey discloses elastomeric retroreflective sheeting. The elastomeric retroreflective sheeting has a monolayer of non-stretchable microspheres. These microspheres are embedded in a sheet with a spacing layer of transparent elestomeric material underlying the back surface of the microspheres. A cover layer of transparent elastomeric material covers the front surface of the microspheres. A specularly reflective layer is disposed on the back surface of the spacing layer. The cover layer comprises clear thermoplastic elastomeric aliphatic polyurethane. This retroreflective sheeting does not suggest a marine craft rope.

U.S. Pat. No. 4,957,335 to Kuney discloses microsphere-based retro-reflective articles having high retroreflective brightness at narrow divergence or observation angles, i.e. up to 0.5 degrees. The article is made by selection of microspheres having defined combinations of average diameter and average refractive index. This patent teaches (column 4, lines 18-23) that variation in the size of the microspheres will increase the observation angle or divergence angle of the resultant retro-reflective article. The reflective spheres reflect only in a narrow range and the flat coating does not provide omnidirectional reflection.

U.S. Pat. No. 5,066,098 to Kult, et al. discloses a cellular, encapsulated-lens, high whiteness retroreflective sheeting having a flexible cover sheet. This cellular, encapsulated-lens retroreflective sheeting comprises a base sheet of a monolayer of retroreflective elements that is partially embedded in a binder layer, which typically is white. A cover sheet is disposed in spaced relation from the layer of retroreflective elements. A network of narrow intersecting bonds, or seal legs, that extend between the cover sheet and the base sheet with binder material are thermoformed at the point of contact between the base sheet and cover sheet. Such a rigid, reflective sheet is unsuitable for ropes, which require structures that can twist and flex. U.S. Pat. No. 5,117,304 to Huang, et al. discloses a retroreflective article. The retroreflective article has corner cubes and is flexible. It can be applied over irregular surfaces by using an optically clear, aliphatic polyurethane polymer. The aliphatic polymer is composed of a plurality of hard chain segments having the formula —C(O)N(H)—C$_6$ H$_{10}$—N(H)C(O)—. The hard chains of cured polyurethane provide a hard, inflexible coating which cannot be applied over a flexible rope.

U.S. Pat. No. 5,200,262 to Li discloses a launderable retroreflective appliqué. The appliqué employs a reflector that comprises elemental aluminum or elemental silver on the backside of the microspheres. The appliqué comprises a monolayer of metal-coated microspheres partially embedded in and partially protruding from a binder layer. The binder layer comprises a flexible polymer having hydrogen functionalities and one or more isocyanate-functional silane coupling agents. The disclosed flexible polymers that possess hydrogen functionalities are crosslinked, flexible urethane-based polymers, such as isocyanate-cured polymers or one or two component polyurethanes and polyols. This reflective appliqué does not disclose or suggest the construction of a marine craft rope.

U.S. Pat. No. 5,283,101 to Li discloses a launderable retroreflective appliqué comprising a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene, such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. When the appliqué is inverted, light comes through the binder layer. This reflective appliqué provides no disclosure concerning a marine craft rope.

U.S. Pat. No. 5,777,790 to Nakajima discloses a microsphere-based retroreflective article. The retroreflective article comprises a monolayer of microspheres partially embedded in and protruding from a binder layer and specular reflector underlying the microspheres. The monolayer of microspheres comprises a mixture of a first class of microspheres having a first refractive index and a second class of microspheres having a second refractive index. The second refractive index is higher than the first refractive index. As a result, the sheeting exhibits superior observation angle angularity. This is a reflective coating with two layers having a different refractive index. There is no disclosure that this coating is applied to a rope and the presence of two polymeric coatings may debond and degrade when bent or twisted.

U.S. Pat. No. 5,882,796 to Wilson, et al. discloses bonded structured retroreflective sheeting. The structured retroreflective sheeting includes an array of corner cube, structured retroreflective elements, a thermoplastic sealing film located proximate to the structured elements, and a bonding agent between the sealing film and the structured retroreflective elements. The bonding agent bonds the sealing film to the structured retroreflective film. This bonded structure is rigid and is unlikely to survive the flexing and twisting movements of a rope.

U.S. Pat. No. 5,926,314 to Smith, et al. discloses a retroreflective cube corner article having scalene base triangles. The cube corner retroreflective article exhibits a wide range of retroreflective entrance angularity in at least one plane, and preferably in two or more planes. The structured surface has an array of cube corner elements formed by three intersecting sets of substantially parallel grooves. Each cube corner element includes a base triangle bonded by one groove from each of the three intersecting groove sets, the base triangle being scalene. The corner cube reflector is rigid and cannot be used for producing reflective ropes.

U.S. Pat. No. 5,962,108 to Nestegard, et al. discloses a retroreflective polymer coated flexible fabric material and method of manufacture. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA). These polymers are flexible, durable, and resistant to abrasion. The retroreflective prismatic elements layer includes: acrylic polymers, such as poly(methylmethacrylate); polycarbonates; cellulosics; polyesters such as poly(butyleneterephthalate); poly(ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material that includes: polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Such a reflective fabric does not suggest the shape, construction or function of a marine craft rope.

U.S. Pat. No. 5,910,858 to Frey discloses retroreflective sheeting with a coated back surface. The retroreflective sheet has a plurality of indentations on the back surface to reflect the light, and a transparent front surface to encapsulate and protect the light reflecting indentations. This reflective sheet is rigid and is unsuitable for use as a marine craft rope.

U.S. Pat. No. 6,159,537 to Crandall discloses a method of making a retroreflective article that has a binder layer containing an epoxy resin and silicone crosslinked polymer. A pre-binder composition comprises about 5 to about 40 parts of an epoxy resin. About 60 to about 95 parts of an alkoxysilane terminated polymer is applied to a retroreflective layer and then cured to form a binder layer that is adhered to the retroreflective layer and an article of clothing. The binder composition does not cover the exterior surface of the reflective layer and does not provide abrasion resistance needed for a marine craft rope.

U.S. Pat. No. 6,677,028 to Lasch, et al. discloses retroreflective articles having multilayer films and methods of manufacturing same. These retroreflective articles have multilayer films and are useful for commercial graphics and retroreflective products, such as roll-up signs for highway transportation safety. The articles comprise multilayer films having at least one layer of polyurethane and a core layer of a copolymer of alkylene and a bond layer of non-acidic, polar co-monomer including, ethylene copolymer, vinyl acetate, acrylate, EVA, acid-modified EVA, anhydride-modified EVA, acid-acrylate-modified EVA, anhydride-acrylate-modified EVA, EEA, EMA, AEA, EVACO, EBACO, and EnBA. The glass retroreflective beads comprise an air-exposed portion or have an overlay polyurethane or EAA cover film. When retroreflective glass beads are exposed to air, they are subject to wear and therefore the multilayer retroreflective films articles may not be used on a marine craft rope.

U.S. published patent applications 20050157389 and 20050157390 to Shipman et al. discloses retroreflective elements and articles. The retroreflective elements and retroreflective articles are used as pavement markings and comprise retroreflective elements forming laminates. The retroreflective elements are not incorporated in a rope suited for marine craft use.

U.S. Pat. No. 4,167,156 to Kupperman, et al. discloses a reflective animal leather leash. The elongated leather animal leash includes a sewn a transparent polyvinyl chloride strip with a light reflective prism design on one surface. The light reflective prism is bonded by dielectric heat sealing or sonic welding to an opaque polyvinyl chloride strip sewn to the leather strip, resulting in a leash having a light reflective surface. Since the strip has a reflective surface on only one side of the leash, it does not reflect light in every direction. The flat leather leash is not easily twistable and is not readily bent without separating the transparent and opaque polyvinyl chloride layers. Therefore, this flat strip reflective configuration is unsuited for marine craft ropes.

U.S. Pat. Nos. 5,243,457 and 5,237,448 to Spencer disclose a material with enhanced visibility characteristics. This flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. Bonded, i.e. by heat-sealing, to the first layer is a second layer of plastic luminescent material. The second layer is contiguously and integrally attached to the underlying surface of the prism-like formations and generally coextensive therewith. The visibility enhancing material simultaneously radiates luminescent light from the second layer through the underlying surface of prism-like formations and through the smooth light transmissive surface and reflects light from the prism-like formations through the smooth light transmissive surface. In one embodiment, the visibility enhancing material includes a flexible elongate member. In another embodiment, the second layer is replaced with a layer of luminescent material, which can be selectively energized to become luminous. This embodiment requires wires and illumination sources that can be easily integrated into a pet leash that can be twisted and flexed. Since the transparent reflective material is a molded plastic of prismatic construction it is rigid and is not flexible and does not form a leash that is capable of being twisted and bent, key functional requirements for a marine craft rope. Further any twisting and bending action separates the reflective element from the luminescent element.

U.S. Pat. No. 6,355,349 Chizmas discloses reflectively enhanced coated cable. This coated cable includes a structural core made of twined wire or other suitable material, and an outer thermoplastic layer surrounding the structural core, such outer core being transparent to light and a reflective layer that reflects the incident light imposed between the structural core and the outer layer. In a second embodiment, a reflective layer interposed between the structural core and the outer layer, the reflective layer being provided in the form of a wrapped tape disposed below the outer layer. The wrapped tape of reflective material is not braided and therefore cannot take the bending and twisting action of a marine craft rope.

U.S. Pat. No. 6,925,965 to Hurwitz discloses flexible omnidirectionally reflective pet leash having handle, central pet leash, and pet collar sections that reflect an incoming light beam back in the same direction as it was emanated. The reflected light beam provides accurate illumination of the pet owner's hand, pet leash and the location of the pet during dusk or nighttime hours. This flexible omnidirectionally reflective pet leash is created by surrounding a central braided rope of nylon or polyethylene fibers with a cylindrically braided reflective sleeve composed of narrow width reflective strips that comprise narrow woven, braided or knitted nylon or polypropylene strips thermally bonded to a flexible polymeric sheet with attached retroreflectors of the corner cube or microsphere configuration. This omnidirectionally reflective pet leash reflects light over a larger angle of acceptance, illuminating pet owner's hand, the leash, and the pet's collar, thereby providing an improved measure of safety for both the pet and the pet handler. This omnidirectional pet leash does not suggest a rope suitable for marine craft applications; and it does not contain a structural, load resisting core.

U.S. published patent applications 20060026933 and 20060026934 to Hurwitz disclose an omnidirectionally reflective horse halter. This flexible omnidirectionally reflective horse lead has a central portion, and mechanical attachment means to accommodate a bridal bit ring. The lead reflects an incoming light beam from a walker or horseback rider back in the direction from which it emanated, preventing dangerous encounters during dusk or nighttime hours. The omnidirectionally reflective elements may be incorporated in a horse harness, or in a halter suitable for horses roaming in a paddock or field. The reflective elements are created by surrounding a central braided rope of nylon or polyethylene fibers with a cylindrically braided reflective sleeve. The braided reflective sleeve is composed of narrow width reflective strips having a show surface with a flexible nylon retroreflective sheet sewn thereto. Reflectivity is achieved by thermally bonding corner cube or microsphere retroreflectors to a flexible polymeric sheet. Due to its braided construction, the reflective elements reflect light omnidirectionally over a large angle of acceptance, illuminating the horse harness or halter. An improved measure of safety is thereby provided for both the horse and the horseback rider. This omnidirectionally reflective horse halter is not a rope suitable for marine craft applications; and it does not contain a structural load-resisting core.

U.S. published patent application 20060027188 to Hurwitz discloses an abrasion resistant omnidirectionally reflective pet leash. This flexible abrasion resistant omnidirectionally reflective pet leash has handle, central pet leash, and pet collar sections that reflect an incoming light beam back in the same direction as it was emanated. The reflected light beam provides accurate illumination of the pet owner's hand, pet leash and the location of the pet during dusk or nighttime hours. This pet leash is created by surrounding a central braided rope of nylon or polyethylene fibers with a cylindrically braided reflective sleeve that is coated with an abrasion resistant transparent polymeric coating. The braided reflective sleeve is composed of narrow width reflective strips that comprise a woven or knitted narrow width strip and a flexible nylon retroreflective sheet sewn thereon. The flexible retroreflective sheet is formed by thermally bonding corner cube, microsphere retroreflectors, or wide-angle exposed retroreflective lenses to a flexible polymeric sheet. Due to its braided construction, the reflective pet leash reflects light omnidirectionally over a large angle of acceptance, illuminating the pet owner's hand, the leash itself, and the pet's collar, thereby providing an improved measure of safety for both the pet and the pet handler. This abrasion resistant omnidirectional pet leash is not a rope suitable for marine craft applications; it does not contain a structural load-resisting core.

Notwithstanding the efforts of prior art workers to construct a rope for marine craft applications there is clearly a need for a flexible, bendable, high strength rope that is omindirectionally reflective so that any light from a vessel is directly reflected back to the source regardless of its approaching direction, thereby delineating the shape of a vessel, its sails and its mooring lines. This back reflection is clearly visible from a longer distance, and therefore the driver of the approaching vessel can take evasive action preventing marine or lake boating/sailing or commercial fishing vessel accidents.

SUMMARY OF THE INVENTION

The present invention provides an abrasion resistant omnidirectionally reflecting rope suited for marine craft and other boating or sailing applications. The rope is provided with a structural core that is capable of withstanding significant loading and yet is flexible enough for easily knotting to secure the boat to a mooring or an anchor. Recently high strength polyethylene or polypropylene gel fibers having oriented polymeric molecular chains have been available and are marketed under the trade name Spectra™ or Dynema™ have been universally accepted in the marine craft industry. The structural core of the rope may contain these gel fibers mixed with other fibers such as p-aramid Kevlar™ fibers cotton, polyester, nylon and the like to form a marine craft rope structural core. While Spectra™ or Dynema™ are generally white in color, p-aramid fibers are black. The other fibers may be colored to any suitable color. The structural core of the rope is highly corrosion resistant and is not omindirectionally reflective and therefore does not reflect light back to the light originating source and therefore do not stand out in a dark or foggy environment and therefore their presence cannot be discerned from a distance. The present invention uses this structural high strength core that is covered with braided tapes of retroreflective sheets forming a cylindrical sleeve that is attached in places to the structural core to allow flexing of the retroreflective tapes when the rope is twisted or flexed. The braided tapes of retroreflective sheets may be covered with an abrasion resistant coating to prevent damage to the retroreflecting elements incorporated in the braided sheets. Due to the cylindrical sleeve construction of the retroreflective tapes, retroreflecting elements are available in the entire 360 degree orientation surrounding a rope, so that light incident from any direction is directly reflected back to the source providing a bright reflection that is observable from a distance that is further away than that possible by light illumination. Since the back reflected light is collimated with a divergence similar to that of the incident light, the brightness delivered to the source is also similar in divergence and intensity comparable to viewing the source from about twice the distance representing the sum of forward path and the reflected path. This intensity is significantly larger than that of diffused scattered light from a common object.

The braided tapes forming the sleeve of the omnidirectionally reflecting rope contain retroreflective elements, which may be retroreflective corner cube reflectors or microspheres or retrorelective lenses. These retroreflective elements are thermally bonded to a nylon mesh strip to form a flexible nylon retroreflective sheet, which is in turn sewn onto a narrow width reflective strip. With this structure, the rope reflects a significant quantum of the incident light from a light source or other light emitting element back to the source. The abrasion resistance property of the rope is provided by a transparent coating. The polymeric coating is flexible and has a refractive index significantly smaller than that of the retroreflective elements used. Abrasion resistance and omnidirectional reflectivity is achieved by: a) creating a flexible retroreflective sheet comprising a plurality of corner cube reflectors bonded via a transparent bond to a flexible polymeric sheet, or several microspheres bonded via a transparent bond to a reflectorized flexible polymeric sheet; b) producing a narrow width strip composed of nylon or polypropylene fibers by knitting, weaving or braiding, to achieve a strip width in the range of 0.0065 inch to 0.25 inch, depending upon the size of the central cylindrical rope core;

c) thermally bonding a flexible retroreflective sheet onto a nylon mesh strip to form a flexible nylon retroreflective sheet which is in turn sewn onto a show surface of the narrow width strip, thereby forming a narrow width reflective strip; d) cylindrically braiding, at a shallow braid angle, three or more narrow width reflective strips to surround and cover the external surface of a cylindrical high strength structural core of the rope made from braided Spectra™ or Dynema™ together with fibers selected from nylon, cotton, polyester, polypropylene and/or p-aramid fibers; e) forming a cylindrical retroreflective braided sleeve integrally surrounding a central cylindrical structural rope core to thereby create a marine craft rope having an external retroreflector surface; and f) coating or surrounding the external surface of the cylindrical retroreflective braided sleeve with a transparent, flexible abrasion resistant coating or a transparent polymeric sleeve having a refractive index significantly less than that of the retroreflective elements. The thickness of the transparent abrasion resistant coating is in the range of 0.002 to 0.010 inches.

The cylindrical character of the flexible cylindrical braided sleeve reflects a significant quantum of incident light back to the source effectively since some portion of the braided sleeve is always at angles close to normality and most of the braided cylindrical sleeve falls within the reflecting angular range of the retroreflectors. The shallow braiding angle of the cylindrical braid sleeve lays the thermally bonded narrow width strips at a shallow angle with respect to the length of the cylindrical central core. As a result the marine craft rope can be readily flexed or twisted due to the relative movement provided within the cylindrical braid sleeve structure. The flexibility of the transparent abrasion resistant coating provides for flexing and twisting movement of the abrasion resistant marine craft rope without coating separation or delamination.

The external surface of the cylindrical retroreflective braided sleeve is coated with a transparent, flexible abrasion resistant polymeric coating. The coating applied has a refractive index significantly lesser than that of retroreflective elements. Typically the retroreflective elements have a refractive index of 1.9 to 2.2 and the flexible transparent abrasion resistant polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

The marine craft rope comprises a cylindrical reflective braided sleeve having three or more narrow width reflective strips that are braided at a shallow cylindrical braid angle, said cylindrical reflective braided sleeve being operable to surround the central cylindrical braided high strength braided rope core thereby providing omnidirectional reflectivity. Each narrow width reflective strip has a flexible nylon retroreflective sheet sewn to their show surface. The flexible nylon retroreflective sheet is formed by thermally bonding a retroreflector coated flexible polymer sheet to a nylon mesh strip.

The omnidirectionally reflective rope is highly flexible due to the braided construction of the braided high strength core and cylindrically braided reflective sleeve. The rope can be knotted to attachment points in marine craft environment including sail attachments, mooring line attachment, etc. The rope can be attached to edges of railings or gunners using nails or staples which penetrate the braided structure without damaging high strength fibers.

The omnidirectionally reflective rope may be used in several applications providing omnidirectional reflection thereby delineating the details of a vessel from a great distance even under dusk, fog or dark environment. Examples of such uses include (i) painter lines for dinghies; (ii) braided rope associated with life preservers; (iii) rope railings for vessels; (iv) braided rope associated with the periphery of sails, that serves to outline the shape of a sail; (v) rope running along the edges of a ship's gunnels to outline the shape of a vessel; (vi) mooring lines (for securing a vessel to a mooring); (vii) sheets and lines associated with block and tackle, which are used to hoist and lower a ship's sails, and to control the attitude of the sail relative to the wind; (viii) lines along a finger pier; (ix) rope railings around docks; and (x) rope separating designated areas on or about docks.

Each of these applications would benefit from use of an omnidirectionally reflective rope having improved visibility. The omnidirectionally reflective rope is more easily seen when illuminated by a light source. It is more readily located and more easily avoided by other ships navigating in dimly lit conditions. Accidents heretofore encountered when dinghies and larger vessels become entangled with mooring lines and painters during harbor navigation would be virtually eliminated. The improved safety resulting from higher visibility of lifelines and life preservers is readily apparent.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

The present invention provides an omnidirectionally reflective rope that is flexible, twistable and omnidirectionally reflective. It has a high strength braided central core capable of withstanding loads encountered in a marine craft application. The structural core is made from high strength fibers such as Spectra™ or Dynema™ gel fibers, Kevlar™ p-armaid fiber alone or in combination with other fibers including cotton, nylon, polyester, polypropylene fibers.

The omnidirectionally reflective rope reflects incident light back to its source, thereby clearly defining the boat, vessel, painters, railings and mooring or fishing lines. This increases the margin of safety in dusk, fog or night time environments when vessel light illuminates the omnidirectional reflective rope thereby reducing the possibility of accidents. Since the omnidirectionally reflecting rope reflects light over a broad range, due to its reflective cylindrical sleeve arrangement, the light can be at a significant angle and could still be reflected back.

The abrasion resistant omnidirectionally reflective rope is constructed by building a cylindrically reflective sleeve from narrow width strips of nylon or polypropylene. Reflectivity is achieved by first selecting a flexible polymer sheet and coating the flexible polymer sheet with a plurality of retroreflectors using a transparent binder to form a retroreflector coated flexible polymer sheet. The retroreflector coated flexible polymer sheet is then thermally bonded to a nylon mesh strip to form a flexible nylon retroreflective sheet. The flexible nylon retroreflective sheet is then sewn onto a show surface of a narrow width reflective strip. At least three of these narrow width reflective strips are braided at a shallow cylindrical braid angle to form an omnidirectionally reflective sleeve having a braided construction.

The retroreflecting elements may be corner cubes, in which case the polymeric flexible sheet can be non-reflective. Alternatively, the retroreflecting elements may be microspheres. If microspheres are used as retroreflective elements, the polymeric flexible sheet needs to be reflective and is typically metallized with aluminum or silver. Alternatively, the reflecting elements may be retroreflective lenses that may be embedded in a transparent polyurethane adhesive and used as a reflective strip or bonded to durable cloth. In either case, the retroreflective elements are bonded to the flexible sheet using a transparent binder.

The flexible sheet with retroreflective elements is available from 3M Corporation. The trade name for this product is SCOTCHLITE and the flexible polymer is typically PVC. The product is available in a variety of sizes. The flexible reflectorized sheets may be delivered onto another material by way of utilizing transfer films. These transfer films are composed of retroreflector elements bonded to a variety of heat-activated adhesives. The retroreflector elements include wide angle, exposed retroreflective lenses bonded to a heat activated polyurethane adhesive. The reflective surface is protected by a white paper liner for ease in handling prior to lamination. A plastic liner protects the adhesive side and must be removed before lamination onto the nylon mesh strip. This flexible reflectorized sheet is thermally bonded to a nylon mesh strip, woven or knitted to form a flexible nylon retroreflective sheet.

The nylon mesh strip may have a width of 0.0165 cm to 0.635 cm (0.0065 inches to 0.25 inches) and is thermally bonded to a SCOTCHLITE strip having a width slightly less than the width of the nylon mesh strip. The SCOTCHLITE strip is bonded the entire length of the nylon mesh strip, and is bonded centrally on the nylon mesh strip, so that there are equal side portions of the nylon mesh strip on both sides of the SCOTCHLITE strip. The side portions are then sewn to a narrow width strip. The thermal bonding binder may be selected from a number of polymeric binders including, but not limited to, polyvinyl chloride, polyethylene, polyurethane, polyvinyl acetate or acrylates.

The SCOTCHLITE™ reflective material is composed of wide angle, exposed retroreflective lenses bonded to a heat activated polyurethane adhesive. Alternately, the reflective material is composed of wide angle, exposed retroreflective lenses bonded to durable cloth backing comprised of 65% polyester, and 35% cotton, which is then treated with a polyurethane adhesive and thereby thermally bonded to a nylon mesh strip.

The SCOTCHLITE™ reflective material with the durable cloth backing is then thermally bonded onto a nylon mesh strip to form a flexible nylon retroreflective sheet. The flexible nylon retroreflective sheet is sewn onto a narrow width reflective strip by sewing using a lockstitch with no more than 12 stitches 2.54 cm (per 1 inch), and not less than 2 mm (5/64 inches) from the edge of the reflective fabric. The flexible nylon retroreflective sheet is highly flexible and can be cylindrically braided, for example, through the braiding of the narrow width strip to which it is attached via sewn to the surface thereof. At least three of these narrow width reflective strips are braided at a shallow cylindrical braid angle to form an omnidirectionally reflective sleeve having a braided construction surrounding a central high strength rope core, which substantially sustains the tensile forces encountered.

The abrasion resistant omnidirectionally reflective rope is constructed by building a cylindrically reflective sleeve from the narrow width strips of nylon or polypropylene having flexible nylon retroreflective sheets sewn thereto. The cylindrical braiding employs three or more narrow width strips. The cylindrical braiding is accomplished with a small angle between narrow width strips and the longitudinal direction of the central high strength rope core.

Reflective material is bonded to a heat activated adhesive to form a transfer film. Alternatively, reflective material may be comprised of glass beads, partially embedded in fabric and coated with a polymer matrix, while still providing exposure of the glass beads to promote optics to form a fabric. The fabric is metalized with silver for abrasion and for industrial use. The reflective material may be impregnated with aluminum, which stands up well to home washing and works well with abrasion protection. The fabric may be laminated with a polyester film (mesh) in back for sewing purposes, and further treated with a heat activated adhesive for thermally bonding to a surface. For example, SCOTCHLITE™ reflective material utilizing silver fabric metalized with aluminum may be utilized. The reflective material by SCOTCHLITE™ sold as transfer film 8710—silver transfer film or, alternatively, 8910 silver fabric, may be utilized. An example of a transfer film and a fabric commercial reflective material by SCOTCHLITE™ is illustrated below:

TABLE A

| Product Name | Daytime Color | Reflected Color | Abrasion |
| --- | --- | --- | --- |
| 8710 Silver Transfer Film | Silver | White | EN 530 Method 2/ 5000 cycles |
| 8910 Silver Fabric | Silver | White | EN 530 Method 2/ 5000 cycles |

* SCOTCHLITE ™ is certified to meet ANSI/ISEA 1-7-1999 Level 2 retroreflective performance and EN 471 Class 2 retroreflective performance.

A transparent abrasion resistant coating is applied to the outer surface of the cylindrically reflective braided sleeve of the omnidirectionally reflective rope and is applied as a substantially conformal coating. The reflective strips have retroreflective elements embedded in the strips having a corner cube prismatic or microsphere geometry. These transparent retroreflective elements are made from high refractive index transparent materials such as barium oxide-titanium oxide containing glasses. They exhibit a refractive index in the range of 1.9 to 2.2. The transparent abrasion resistant polymeric coating is selected to have a refractive index, which is significantly less than that of the retrorefractive elements. As a result, the incident and reflected light path is not significantly altered even when the incident beam is inclined to the reflective strips. The internal reflection process within the retroreflective elements is not deteriorated by the transparent abrasion resistant coating. The polymers suitable for use with the transparent abrasion resistant coating have a refractive index in the range of 1.3 to 1.55.

In addition to this refractive index requirement, the transparent abrasion resistant coating must exhibit excellent mechanical properties, including tensile strength and elongation, in order to provide the required abrasion resistance. The polymer coating must also exhibit superior bond properties to the retroreflective elements and the underlying polymeric sheet of the reflective strip. If the bond properties are poor, the transparent abrasion resistant coating may delaminate when the rope is subjected to abrasion or flexing and twisting movement. The transparent abrasion resistant coating must have low elastic modulus so that it remains flexible when the rope is twisted. A high modulus transparent abrasion resistant coating is not desired since it applies significant stresses at the coating—reflective tape interface resulting in deterioration or fracture of the retroreflective elements.

A number of polymer systems meet these requirements. These polymers may be applied by dipping the cylindrically braided omnidirectionally reflective rope in a polymeric melt or by spraying a polymer composition dissolved in a suitable solvent. Thermosetting resin compositions such as two-component polyurethane may be painted or sprayed over the cylindrically braided reflective outer surface of the omnidirectionally reflective rope. In Table B below there are listed a number of transparent polymer compositions suitable for the rope abrasion resistant coating. Also listed are the refractive indexes for the compositions.

TABLE B

| Polymer Name | Refractive Index |
|---|---|
| aliphatic thermoplastic polyurethanes | 1.35 to 1.45 |
| Dow Corning OE-4100 Silicone elastomer | 1.4751 |
| Polymethyl tetradecyl siloxane | 1.4550 |
| Poly vinyl acetate | 1.4665 |
| PMMA Poly methyl methacrylate | 1.4893 |
| Cellulose acetate | 1.4750 |
| Ethylene/vinyl acetate copolymer EVA | 1.4820 |

Thermoplastic aliphatic thermoplastic polyurethanes are preferred as compared to aromatic urethanes because of their transparency, resistance to dirt build-up, flexiblility ultra-violet radiation degradation resistance. Typically, aliphatic polyurethane has the structure

[—O—(CH(CH$_3$)CH2O$_{20}$—C(O)—NH—R—NH—C(O)—]; or

[—O—(CH$_2$—CH$_2$CH$_2$ CH$_2$—O—)$_{10}$—C(O)—NH—R—NH—C(O)—], where R is a non-aromatic group.

Rohm and Haas, (Morton International Inc) supplies melt extrudable polyurethane compositions under the trade name designation MORTHANE L430.77 and MORTHANE Brand PN 3429-215. A melt extrusion process may be used to coat the external surface of the cylindrically braided reflective sleeve Aptec Laboratories, 28570, Livingston Avenue, Valencia Calif. 91355-4171. 661-257-1677 markets polyurethane with low elastic modulus for conformal coatings. Two component APTEK transparent unfilled polyurethane compositions of interest include the composition 2503-A/B (www.apteklabs.com/products/2503-AB.pdf) and the composition 2506-A/B (www.apteklabs.com/products/2506.pdf). These two compositions are designed for the encapsulation and protection of devices in applications that require toughness, excellent flexibility and optimum tensile strength, as well as elongation characteristics. APTEK 2503-A/B is curable at 80 C while APTEK 2506-A/B is room temperature curable. Both compositions are dissolved in a solvent and are therefore suitable for brush or spray application.

Bayer provides a number of clear polyurethane coating compositions based on one component or two component systems. Desmodular I aliphatic diisocyanate is often abbreviated to IPDI, CAS 4098-71-9. Polyurethane prepared from IPDI is clear, tough and resists photodegradation and hydrolysis. Isocyanurate based on IPDI is marketed by Bayer under the trade name Z-4470; and is available in a number of solvent blends. Two component polyurethane is commonly formulated with Desmodur Z-4470. Desmodur E polyisocyanates is a single component moisture curable system capable of being diluted in a solvent.

www.setcochemicals.net/resins4.htm discloses a flexible room temperature curing polyurethane coating designated ROTOTHANE® 9020. This coating adheres to plastics and leather.

Dow Corning supplies a number of silicone compositions suitable for coating the cylindrically braided reflective strips to provide abrasion resistance. Conformal coatings are materials applied in thin layers (typically a few mils or a fraction of a mm) onto printed circuits or other electronic substrates. They provide environmental and mechanical protection to significantly extend the life of the components and circuitry. Conformal coatings are traditionally applied by dipping, spraying or simple flow coating, and increasingly by select coating or robotic dispensing. Key requirements for the clear coating are low viscosity, enabling application of thin conformal coatings, room temperature cure in reasonable cure time and reasonable hardness. In Table C below there are shown some of the conformal silicone coatings marketed by Dow Corning.

TABLE C

| Product Name | One part/ Two part | Viscosity CPS | Cure | Durometer |
|---|---|---|---|---|
| 3-1965 | 1 | 110 | RT 24 Hrs Moisture cure | 29 A |
| 3-1953 | 1 | 360 | RT 24 Hrs Moisture Cure | 26 A |
| 3-1765 | 1 | 150 | RT 24 Hrs Moisture cure | 25 A |
| 3-1753 | 1 | 385 | RT 24 Hrs Moisture cure | 25 A |
| Sylgard 1-4128 | 2 | 450 | 20 min/85 C. | 64 OO |

TABLE C-continued

| Product Name | One part/ Two part | Viscosity CPS | Cure | Durometer |
|---|---|---|---|---|
| I-4105 | 1 | 470 | 10 min/105 C. | 65 OO |
| QI-4010 | 1 | 830 | 15 min/110 C. | 30 A |
| I-2620 | 1 | 250 | RT 72 Hrs | 25 D Abrasion Resistant |
| I-2577 LOW VOC | 1 | 1250 | RT 72 Hrs | 25 D Abrasion Resistant |
| I-2577 | 1 | 725 | RT 72 Hrs | 23 D Abrasion Resistant |

Candidates for silicone conformal coating compositions that meet the low viscosity in the range of 100-250 CPS, room temperature cure in reasonable time period and reasonable hardness are coating compositions 3-1965, 3-1765 and I-2620. These compositions may be dipped, brush painted or sprayed.

Of particular interest is a Dow Corning OE-4100 optical silicone elastomer, which cures in 2 hour at 150 C with a platinum based catalyst, as discussed in www.dowcorning-.com/content/photonic/75-1009B-01.pdf. This composition is specifically developed for use in the optical coating of optical components and is clear, transparent with a refractive index of 1.47.

Polyvinyl acetate is soluble in acetone as well as toluene. Acetone dissolved polyvinyl acetate film has a slightly higher elastic modulus as compared to that dissolved in toluene due to rapid evaporation of acetone. Acetone dissolved polyvinyl acetate is applied to the cylindrically braided surface of the rope to form a flexible film which is resistant to twisting action of a rope. Polyvinyl acetate is available from Union Carbide under the trade names AYAC, AYAA, AYAF and AYAT depending upon the molecular weight of the polymer.

Figure 1:
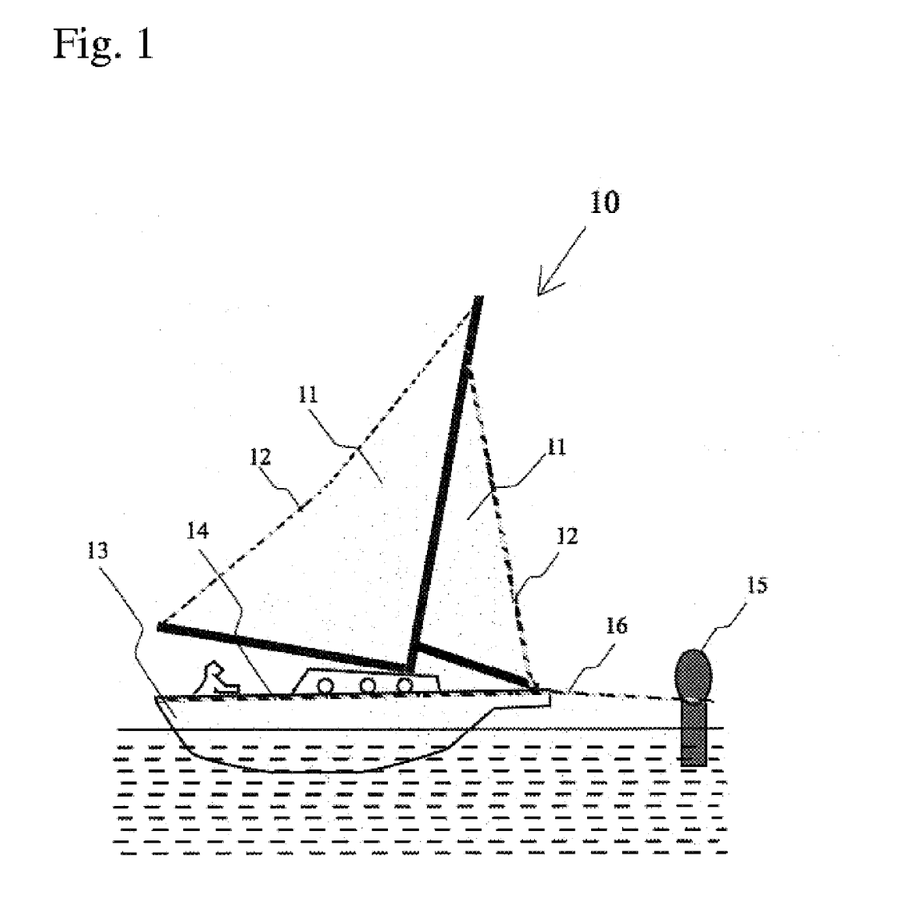
FIG. 1 is a schematic diagram of a vessel with the omnidirectionally reflective rope outlining the sail edges of a sail, edges of ship's gunnels and mooring lines.

FIG. 1 is a schematic diagram illustrating generally at 10 a sailboat with omni directional reflective rope delineating the edges of sails 11 at 12. The sail is supported by the main mast as shown together with the omnidirectionally reflective rope providing attachment of the sail to the fixed attachment points on the sailboat due to the flexibility and abrasion resistance of the omnidirectionally reflective rope. The gunnels of the sailboat are lined with the omnidirectionally reflective rope at 14 and this can be accomplished by nailing or stapling the rope to the edges of the sailboat. The nail or staples penetrate between the fibers of the braided structural high strength core with minimal cutting of these fibers. The incident light on these nail or staple attached omnidirectionally reflecting rope reflects incident light back to the light originating source, thereby delineating the shape of the sailboat. The sailboat is attached to mooring 15 by a mooring line 16, which is also an omnidirectionally reflective rope. This attachment rope is also illuminated by the incident light and is clearly delineated, preventing other boats from becoming entangled with the mooring line.

Figure 2A:
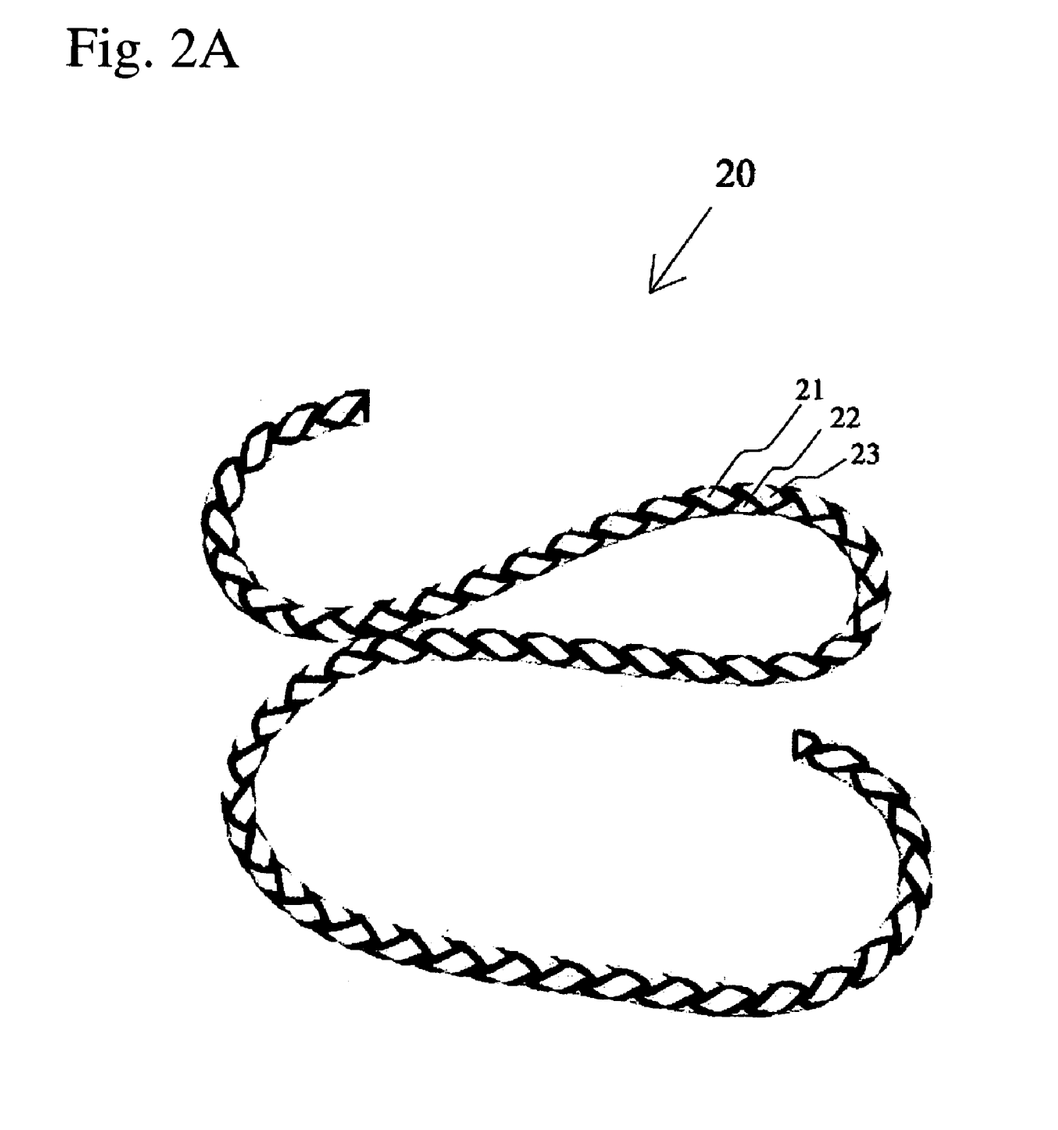
FIG. 2a is a photograph showing omnidirectionally reflective rope with the reflective cylindrical braided sleeve of narrow width strips covering a central structural braided high strength core, taken with camera flash light showing reflective portions as bright regions.

FIG. 2a is a photograph showing generally at 20 the omnidirectionally reflective rope. A cylindrically braided sleeve, created from braided narrow width reflective strips 21, 22 and 23, substantially covers the entire surface of a high strength structural braided core, which is therefore invisible in this photograph, providing omnidirectional reflectivity. The omnidirectionally reflective rope completely reflects incident light in the same direction the light was emanated. Due to the cylindrical character of the reflective braided sleeve, some portion of the sleeve is always at normal orientation with the incoming light beam, that is, the direction at which the reflection from the retroreflective elements is maximized. Retroreflective elements reflect light over a large range of acceptance angles, but the reflection is at a lower intensity. This cylindrical construction effectively reflects the incoming camera flash light as shown in the photograph of FIG. 2a by the extremely bright appearance of the retroreflectors incorporated within the narrow width reflective strips.

Figure 2B:
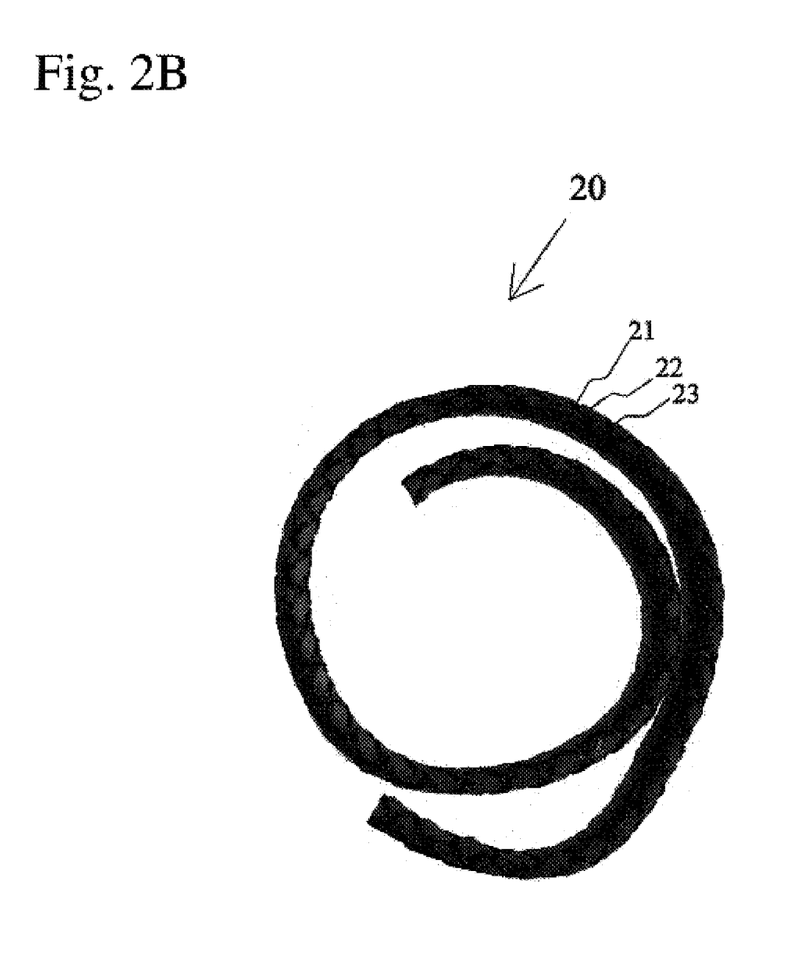
FIG. 2b is a photograph showing omnidirectionally reflective rope with the reflective cylindrical braided sleeve of narrow width strips covering a central structural braided high strength core, taken without camera flash light showing reflective portions as dark regions.

FIG. 2b shows generally at 20 a photograph of another view of the omnidirectional reflective rope illustrated in FIG. 2a without using a camera flash. The illumination comes from the room's light. The light here again is reflected back to the illuminating source, which is the room light, and practically no light is directed in the direction of the camera. As a result, the retroreflector bright areas of FIGS. 2a 21, 22 and 23 now appear dark.

Figure 3:
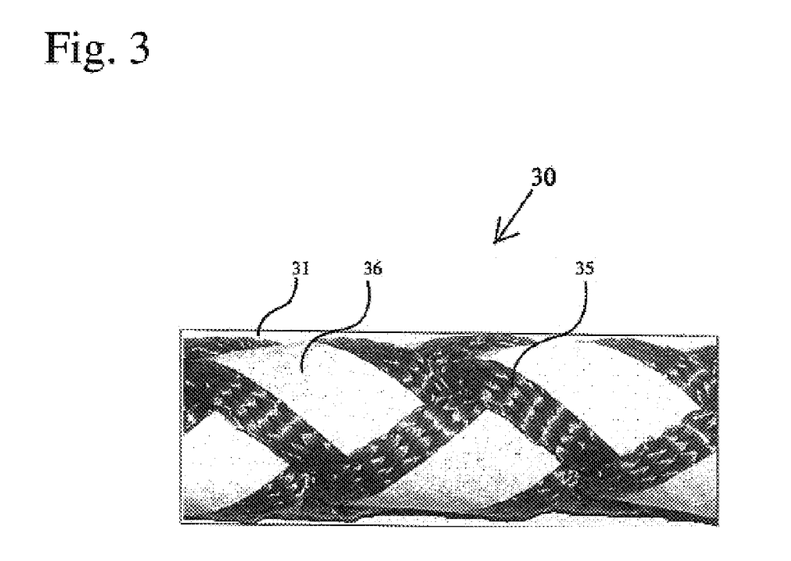
FIG. 3 is a photograph showing omnidirectionally reflective rope illustrating the details of a transparent abrasion resistant polymeric conformal coating substantially covering the reflective cylindrical braided sleeve of narrow width strips surrounding a central structural braided high strength core and also schematically illustrating the construction of the narrow width reflective strips that are braided at a shallow cylindrical braid angle to form the omnidirectionally reflective sleeve.

FIG. 3 is a photograph showing generally at 30 a magnified portion of the omnidirectional reflecting rope. The photograph shows at 31 a transparent abrasion resistant polymeric conformal coating substantially covering the reflective cylindrical braided sleeve of narrow width strips surrounding a central high strength braided core. The cylindrical reflective braided sleeve is braided with a small braid angle of 5 to 10 degrees between the narrow width strips surrounding the central cylindrical rope core of the rope. The central cylindrical high strength braided rope core is completely covered by the cylindrical reflective braided sleeve and therefore is invisible in the photograph. The flexible nylon retroreflective sheet is shown at 36 and the narrow width strip is shown at 35, which is braided to form the cylindrical braided sleeve. The flexible nylon retroreflective sheet 36 is sewn onto a show surface of the narrow width strip 35 prior to cylindrical braiding operation. The outer surface of the flexible nylon retroreflective sheet 36 and the narrow width strip 35 is covered with a transparent conformal flexible abrasion resistant coating 31, which is applied after cylindrical braiding operation.

The key components of the abrasion resistant omnidirectionally reflective rope include, in combination, the features set forth below:

1. a central cylindrical braided high strength core composed of braided high strength fibers including Spectra™, Dynema™ gel fibers and/or Kevlar™ p-aramid fibers in combination with cotton, nylon, polyester or polypropylene fibers capable of sustaining tensile force loads;
2. the central cylindrical braided rope high strength core being covered substantially with a cylindrically reflective braided sleeve coated with a transparent abrasion resistant conformal coating;
3. the cylindrically reflective braided sleeve being formed by cylindrically braiding narrow width reflected strips, formed from knitted, woven or braided nylon, or polypropylene narrow width strips, having a flexible nylon retroreflective sheet, comprising a flexible retroreflective sheet thermally bonded onto a nylon mesh strip, sewn to the surface thereof;
4. each of the flexible retroreflector sheets being prepared by bonding corner cube geometry retroreflectors to a flexible polymeric sheet using a transparent binder;
5. such flexible retroreflector sheets alternately being prepared by bonding microsphere geometry retroreflectors to a metallized reflective flexible polymeric sheet using a transparent binder;

6. each of the flexible retroreflective sheets being thermally bonded to a nylon mesh strip to form a flexible nylon retroreflective sheet;
7. twist and flexure forces acting on the abrasion resistant omnidirectionally reflective rope being accommodated by the braided construction of the cylindrical reflective sleeve and the flexibility of abrasion resistant coating;
8. the cylindrical braided sleeve-covered rope substantially reflecting incident light back in the same direction as the incident light, clearly indicating the whereabouts of the sail, sailboat, gunners of vessel, its mooring lines and railings; and
9. the abrasion resistant omnidirectionally reflective rope providing an increased margin of safety preventing marine craft accidents due to enhanced visibility in dusk, fog and dark or dimly-lit environments.

The abrasion resistant omnidirectionally reflective rope disclosed herein can be modified in numerous ways without departing from the scope of the invention. For example, the rope can be adapted to cordon off newly paved roads, such as access roads, driveways and parking areas; or to control access to selected areas, such as building construction sites, playgrounds, parks and recreational areas. These and other modifications and uses are intended to fall within the scope of the invention, as defined by the subjoined claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An omnidirectionally reflective rope, comprising:
   a. a central cylindrical braided high strength rope core operable to sustain substantial tensile forces;
   b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
   c. said cylindrical reflective braided sleeve being substantially coated with a conformal transparent polymeric abrasion resistant coating;
   d. said narrow width reflective strips comprising a woven or knitted narrow width strip and a flexible nylon retroreflective sheet sewn thereon, said woven or knitted narrow width strip having a show surface, said flexible retroreflective nylon sheet comprising a flexible retroreflective sheet thermally bonded onto a nylon mesh strip, said nylon mesh strip being sewn onto said show surface of said narrow width reflective strip;
   e. said flexible retroreflective sheet having retroreflectors bonded thereto with a transparent bond layer;
   f. said transparent polymeric abrasion resistant coating having a refractive index lower than that of said retroreflectors; and
   whereby said rope exhibits flexibility in combination with abrasion resistance, and when attached to marine craft hardware by knotting or nail or staple attachment, provides omnidirectional reflectivity operative to delineate and outline or otherwise increase visibility thereof.

2. An omnidirectionally reflective rope as recited by claim 1, wherein said central cylindrical braided high strength rope core comprises braided high strength gel spun fibers or p-aramid fibers or combinations thereof.

3. An omnidirectionally reflective rope as recited by claim 2, wherein said central cylindrical braided high strength rope core comprises cotton, nylon, polyester or polypropylene fibers or combinations thereof.

4. An omnidirectionally reflective rope as recited by claim 1, wherein said cylindrical reflective braided sleeve is braided at a braid angle of 5 to 10 degrees.

5. An omnidirectionally reflective rope as recited by claim 1, wherein each of said narrow width reflective strips has a width of 0.0065 to 0.25 inches.

6. An omnidirectionally reflective rope as recited by claim 1, wherein said flexible retroreflective sheet is thermally bonded to said nylon mesh strip with polyvinyl chloride.

7. An omnidirectionally reflective rope as recited by claim 1, wherein said flexible retroreflective sheet is thermally bonded to said nylon mesh strip with polyvinyl acetate.

8. An omnidirectionally reflective rope as recited by claim 1, wherein said flexible retroreflective sheet is thermally bonded to said nylon mesh strip with polyurethane.

9. An omnidirectionally reflective rope as recited by claim 1, wherein said flexible retroreflective sheet comprises a plurality of corner cube retroreflectors.

10. An omnidirectionally reflective rope as recited by claim 1, wherein said flexible retroreflective sheet comprises a plurality of microsphere retroreflectors bonded to a light-reflecting sheet.

11. An omnidirectionally reflective rope as recited by claim 1, wherein said flexible retroreflective sheet comprises a plurality of wide angle, exposed retroreflective lenses bonded to a heat activated polyurethane adhesive.

12. An omnidirectionally reflective rope as recited by claim 11, wherein said flexible retroreflective sheet comprises a plurality of wide angle, exposed retroreflective lenses bonded to a durable cloth backing.

13. An omnidirectionally reflective rope as recited by claim 1, wherein said retroreflectors have a refractive index in the range of 1.9 to 2.2.

14. An omnidirectionally reflective rope as recited by claim 1, wherein said transparent polymeric abrasion resistant coating has a refractive index in the range of 1.3 to 1.55.

15. An omnidirectionally reflective rope as recited by claim 14, wherein said polyurethane is aliphatic polyurethane.

16. An omnidirectionally reflective rope as recited by claim 14, wherein said polyurethane is melt extruded.

17. An omnidirectionally reflective rope as recited by claim 14, wherein said polyurethane is dissolved in a solvent and sprayed on the said cylindrical reflective braided sleeve.

18. An omnidirectionally reflective rope as recited by claim 14, wherein said silicone comprises a silicone composition having a viscosity in the range of 100-275 CPS.

19. An omnidirectionally reflective rope as recited by claim 1, wherein said transparent polymeric abrasion resistant coating has a thickness in the range of 0.002 to 0.010 inches.

20. An omnidirectionally reflective rope as recited by claim 1, wherein said transparent polymeric abrasion resistant coating polymer is a member selected from the group consisting of polyurethane, silicone, polymethyl methacralate, and polyvinyl acetate.

21. A process for manufacture of an omnidirectionally reflective rope, comprising the steps of:
   a. selecting a braided high strength rope core comprising braided gel spun fibers, p-aramid high strength fibers in combination with cotton, nylon, polyester or polypropylene fibers;

b. selecting a flexible polymer sheet;
c. coating said flexible polymer sheet with a plurality of retroreflectors using a transparent binder to form a retroreflector coated flexible polymer sheet;
d. thermally bonding said retroreflector coated flexible polymer sheet to a nylon mesh strip to form a flexible nylon retroreflective sheet;
e. sewing said flexible nylon retroreflective sheet to a narrow width reflective strip;
f. braiding at least three of said narrow width reflective strips at a shallow cylindrical braid angle surrounding said high strength core to form an omnidirectionally reflective sleeve having a braided construction; and
g. applying a transparent flexible polymeric abrasion resistant conformal coating to substantially cover said omnidirectionally reflective sleeve;
said omnidirectionally reflective rope being operable to sustain abrasion, substantial tensile forces, and to accommodate twist and flexure forces due to strength and movement afforded by said braided construction of said omnidirectionally reflective sleeve.

* * * * *